Oct. 9, 1934.  G. F. MATTMAN  1,976,621
ADVERTISING GLOBE
Filed June 3, 1933

Inventor
Gustave F. Mattman

By Murray and Zugelter
Attorneys

Patented Oct. 9, 1934

1,976,621

UNITED STATES PATENT OFFICE 1,976,621

ADVERTISING GLOBE

Gustave F. Mattman, Cincinnati, Ohio, assignor to The Cincinnati Advertising Products Company, Cincinnati, Ohio, a corporation of Ohio Application June 3, 1933, Serial No. 674,209

1 Claim. (Cl. 40—132)

This invention relates to an advertising or display globe of the kind frequently employed in association with gasoline pumps.

An object of the invention is to provide a device of this kind so formed and constructed as to provide, when lighted, an unusually attractive and entirely illuminated unit.

Another object is to provide means of this kind which may be simply and efficiently produced and which is designed to withstand long usage without danger of breaking or cracking.

These and other objects are attained by the means described herein and illustrated in the accompanying drawing, in which.

Advertising globes of the general design herein illustrated have been used in the past but these have commonly been constructed with a rim formed of metal adapted to hold a pair of glass display plates in spaced oppositely disposed relationship. While the glass plates were of course adapted to be illuminated from within the globe, the metal rim heretofore commonly used was not illuminable and hence the globe was illuminated only on each side and not at all around the rim which formed a considerable portion of the whole device.

The present invention provides for an entirely illuminable globe formed with a rim which admits the passage of light in a manner similar to glass so that the display plates and the rim itself may be illuminated and the effect of a complete luminous unit of similar or varied colors is achieved. The rim of this invention is formed of non-vitreous flexible material so that there is no danger of breakage which might otherwise result if it were attempted to form the rim as well as the display plates of glass. Furthermore, the rim of this invention conforms readily to the shape of the glass plates so that fracture of the plates which might otherwise result if the plates comprised surface imperfections or unevenness, is obviated.

Figure 1:
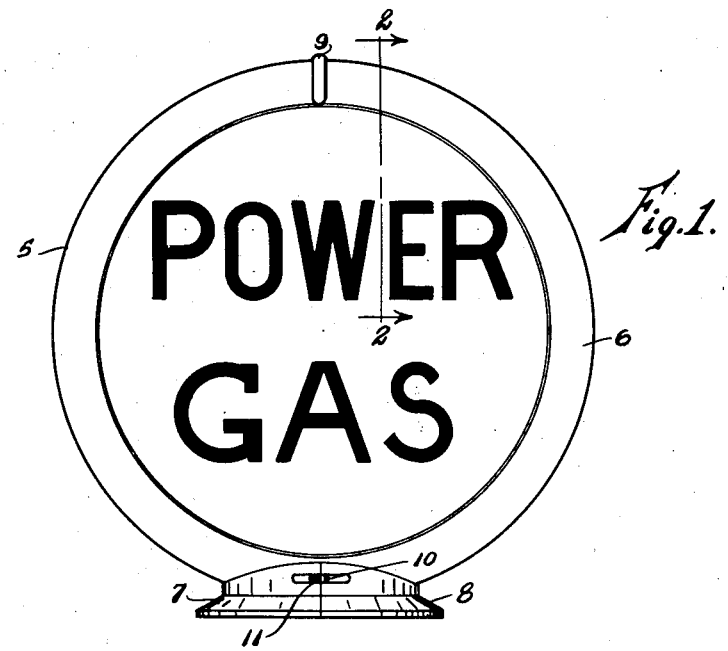
Fig. 1 is a front elevational view of the advertising globe of this invention.
Figure 2:
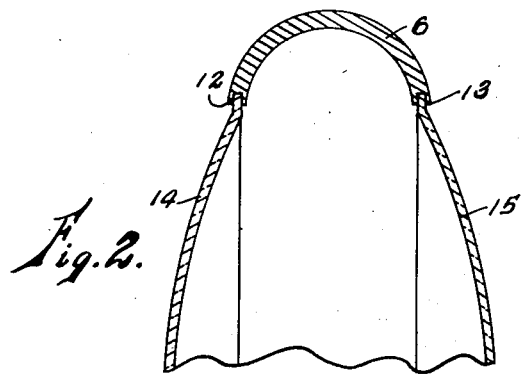
Fig. 2 is a cross sectional view taken on line 2—2 of Fig. 1.

As illustrated herein the globe of this invention is of the character described in my Patent No. 1,933,866, dated November 7, 1933. This device comprises a pair of substantially semi-circular rim sections 5 and 6 each of which is substantially semi-circular in cross section as shown in Fig. 2, and each of which is formed at the bottom to provide complementary sections 7 and 8 forming a base by which the globe is attached to a gasoline pump or other supporting structure. The rim sections 5 and 6 are removably connected at the top of the rim where an overlapping flange 9 lies across the juncture line, and the base sections 7 and 8 are similarly connected as at 10 by a nut and bolt connection associated with a pair of corresponding seats 11, one of the latter being a part of each base section. The rim sections, at their edges, are grooved as at 12 and 13, Fig. 2, for receiving the edges of the display plates 14 and 15. It is to be understood that the edges of the display plates are first fitted into the grooves 12 and 13 and the rim sections then tightened about these plates and attached together in the manner above described.

The rim structure is formed of urea composition which is translucent and which therefore has a luminous appearance when a light is disposed inside the globe. The urea composition comprises urea, formaldehyde and resin powders blended and then molded under pressure and heat. It is obvious, that the whole globe, both the glass display plates 14 and 15 and the rim 6, may be illuminated so that the result achieved is one of pleasing and effective unity. The plates and the rim may be made of the same color or of complementary or contrasting colors but in any event the illumination of the entire device is a distinct improvement over the older type of globe wherein a broad unilluminated rim divided the two illuminated sides of the globe.

What is claimed is:

An advertising globe comprising a rim formed of a translucent integrally-colored urea composition, a pair of glass plates having advertising matter displayed thereon, and means on the rim for engaging the edges of the plates and for holding them in oppositely disposed relationship, the advertising plates being of a color similar to or complementary with the color of the rim whereby the effect of an entirely luminous unit is achieved and the integral color of the rim eliminating the use of paint or the like thereon.

GUSTAVE F. MATTMAN.